(12) United States Patent
Chen et al.

(10) Patent No.: US 7,831,821 B2
(45) Date of Patent: Nov. 9, 2010

(54) SYSTEM BACKUP AND RECOVERY SOLUTION BASED ON BIOS

(75) Inventors: Hanying Chen, Shanghai (CN); Chih-Lung Hou, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1002 days.

(21) Appl. No.: 10/583,649

(22) PCT Filed: Dec. 30, 2005

(86) PCT No.: PCT/CN2005/002401
§ 371 (c)(1),
(2), (4) Date: Jun. 20, 2006

(87) PCT Pub. No.: WO2007/076627
PCT Pub. Date: Jul. 12, 2007

(65) Prior Publication Data
US 2009/0158020 A1     Jun. 18, 2009

(51) Int. Cl.
*G06F 1/24* (2006.01)
(52) U.S. Cl. .............................. 713/2; 714/20
(58) Field of Classification Search .............. 713/2; 714/20
See application file for complete search history.

(56) References Cited

U.S. PATENT DOCUMENTS

| 6,374,265 | B1 | 4/2002 | Chen |
| 6,490,722 | B1 | 12/2002 | Barton et al. |
| 7,111,203 | B2* | 9/2006 | Hu et al. ............... 714/36 |
| 2005/0038836 | A1* | 2/2005 | Wang ................. 707/204 |

FOREIGN PATENT DOCUMENTS

| CN | 1351292 | 5/2002 |
| CN | 1471050 | 1/2004 |
| WO | WO-2007076627 | 7/2007 |

OTHER PUBLICATIONS

Hanying, Chen et al., "System Backup and Recovery Solution Based on BIOS", *International Search Report and Written Opinion from PCT/CN2005/002401*, (Jul. 12, 2007), 6 pages.

* cited by examiner

*Primary Examiner*—Albert Wang
(74) *Attorney, Agent, or Firm*—Blakely, Sokoloff, Taylor & Zafman LLP

(57) ABSTRACT

A system performs system initialization for a computing device, comprising a module to back up one or more files of the computing device in response to a backup request and to restore one or more files of the computing device in response to a recovery request; and a point managing module to set up a backup point that comprises information based on the backup request and locate one or more backup points for the restoration operation.

34 Claims, 4 Drawing Sheets

SYSTEM BACKUP AND RECOVERY SOLUTION BASED ON BIOS

CROSS-REFERENCE TO RELATED APPLICATION

This application is a National Phase application of, and claims priority to, International Application No. PCT/CN2005/002401, filed Dec. 30, 2005, entitled SYSTEM BACKUP AND RECOVERY SOLUTION BASED ON BIOS.

BACKGROUND

Normally, system backup and recovery may depend on third-party applications. Users may spend money to buy commercial software. For example, backup application may comprise standard Win32 application. But, users may worry about compatibility issues among different versions. System backup and recovery operation may also depend on operation systems. If there are several operation systems installed, the backup operation may need to be performed in all installed operation systems. Furthermore, for end users, there is possibility of being troubled by virus. For example, if backup software is infected by virus, the image created using this software may also be infected. In addition, in case of an operation system crash, if a computer system is not able to boot to an operation system, the backup application may not work. Although the computer system may use other ways, such as booting via floppy disk or CD/DVD, etc., such alternatives may not be helpful when users forget to create the floppy disk or the like before the operation system crash.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques to implement system backup and recovery feature in BIOS (Basic Input/Output System). The implementation of the techniques is not restricted in BIOS; it may be used by any execution environments for similar purposes. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures and full software instruction sequences have not been shown in detail in order not to obscure the invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Figure 1:
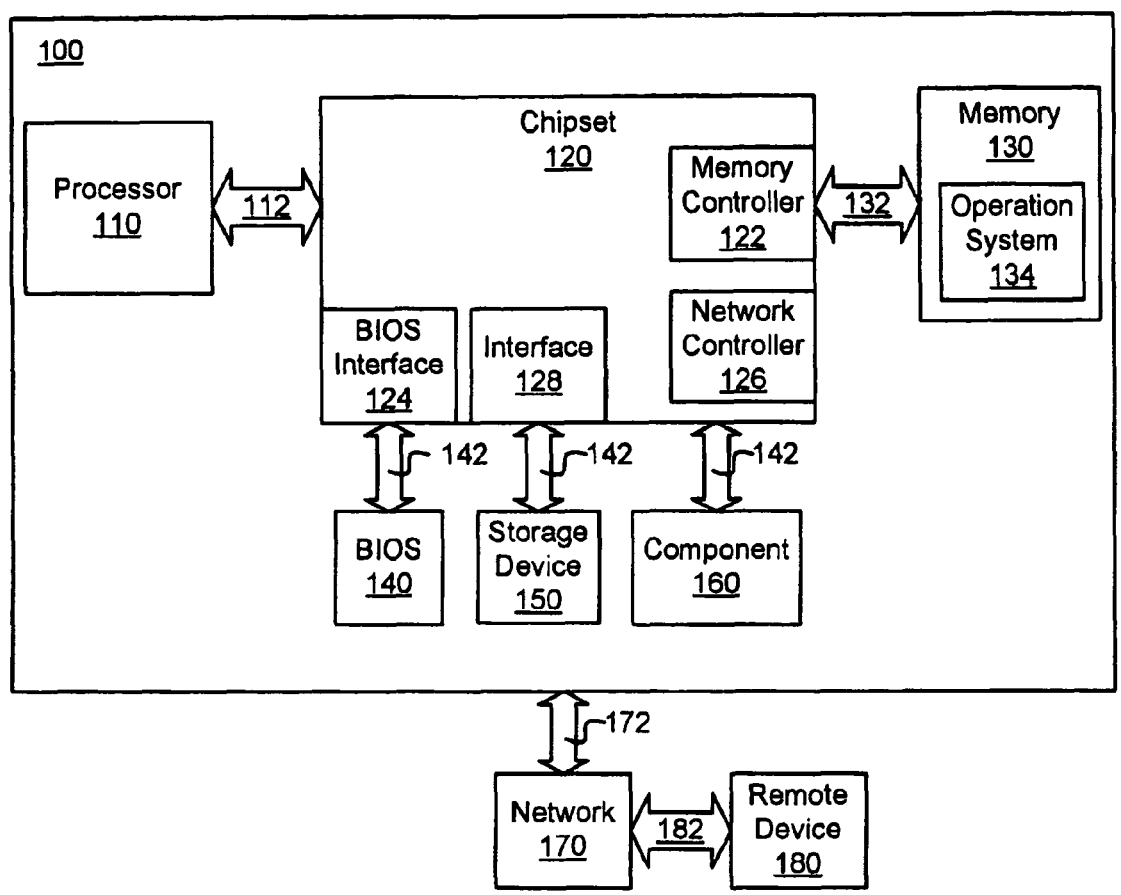
FIG. 1 illustrates an embodiment of a computing device.

FIG. 1 shows an example embodiment of a computing device 100. The computing device 100 may comprise one or more processors 110. The processor 110 may perform actions in response to executing instructions. For example, the processor 110 may executes programs, perform data manipulations and control tasks in the computing device 100, etc. The processor 110 may be any type of processor adapted to perform operations in memory 130. For example, processor 110 may be a microprocessor, a digital signal processor, a microcontroller, or any other processors. In one embodiment, the processor 110 may be not dedicated to the use of memory 130, and the processor 110 may perform operations in memory 130 while also performing other system functions.

The memory 130 may comprise memory devices providing addressable storage locations that a memory controller 122 may read data from and/or write data to. The memory 130 may comprise one or more different types of memory devices such as, for example, dynamic random access memory (DRAM) devices, synchronous dynamic random access memory (SDRAM) devices, read-only memory (ROM) devices, or any other volatile or non-volatile memory devices. Moreover, the memory 130 may be arranged in a hierarchal manner. For example, the memory 130 may be arranged in channels, ranks, banks, pages, and columns. In one embodiment, the memory 130 may store one or more operation systems 134, such as, for example, Windows, etc. In another embodiment, the processor 110 may execute the operation system 134.

The computing device 100 may further comprise a chipset 120. The chipset 120 may comprise one or more integrated circuit packages or chips that couple the processors 110 to memory 130, Basic Input/Output System (BIOS) 140, one or more storage devices 150, and other components (for example, mouse, keyboard, video controller, or other I/O devices of the computing device 100, etc.). The chipset 130 may receive transactions from the processors 110 and to issue transactions to the processors 110 via a processor bus 112.

The memory controller 122 may issue transactions to the memory 140 via a memory bus 132.

In one embodiment, the storage device 150 may store archive information, such as code, programs, files, data, applications, or operating systems. An example of the storage device 150 may comprise a tape, hard disk (HD) drive, a floppy diskette, a compact disk (CD) ROM, a flash memory device, any other mass storage device, any other magnetic storage media, any other optical storage media, any other non-volatile memory devices, etc. The chipset 120 may comprise one or more storage device interfaces 128 that may access each storage device 150 via a bus 142.

In one embodiment, the BIOS 140 may be used for system initialization and/or configuration of the computing device 100. In another embodiment, the BIOS 140 may collect information that may be selectively used by an operation system. For example, the information may comprise a data structure that may be used by the operation system to look up one or more devices in the computing device 100. In another embodiment, the BIOS 140 may comprise routines which the computing device 100 may execute during system backup or recovery. The BIOS 140 may further handle communications in the computing device 100, e.g., between software running on the computing device 100 and/or devices in the computing device 100, such as CPUs, disk drives, or printers, etc. The BIOS 140 may further comprise routines or drivers which the computing device 100 may execute to communicate with one or more components in the computing device 100.

In another embodiment, the computing device 100 may comprise a BIOS memory to store BIOS code or data. The BIOS memory may be implemented with non-volatile memory devices, such as read-only memory (ROM) devices, flash memory, and any other memories. The BIOS 140 may further contain a BIOS USB driver and other drivers. The BIOS 140 may be implemented in a firmware. In one embodiment, the BIOS 140 may comprise a legacy BIOS, extensible firmware interface (EFI) BIOS, or other BIOS. The chipset 130 may comprise a BIOS interface 124 that may access the BIOS 140 via a bus 142. While FIG. 1 shows the BIOS 140 in the computing device 100, some embodiments may employ other device to handle communication and/or perform system initialization in the computing device 100.

In one embodiment, the computing device 100 may communicate with one or more networks 170 via a network bus 172. The chipset 130 may comprise a network controller 126 to control the communication between the computing device 100 and the networks 170. The chipset 130 may further comprise one or more other component interfaces (not shown) to access the other components 160 via one or more buses 142 such as, for example, peripheral component interconnect (PCI) buses, accelerated graphics port (AGP) buses, universal serial bus (USB) buses, low pin count (LPC) buses, and/or other I/O buses.

Figure 2:
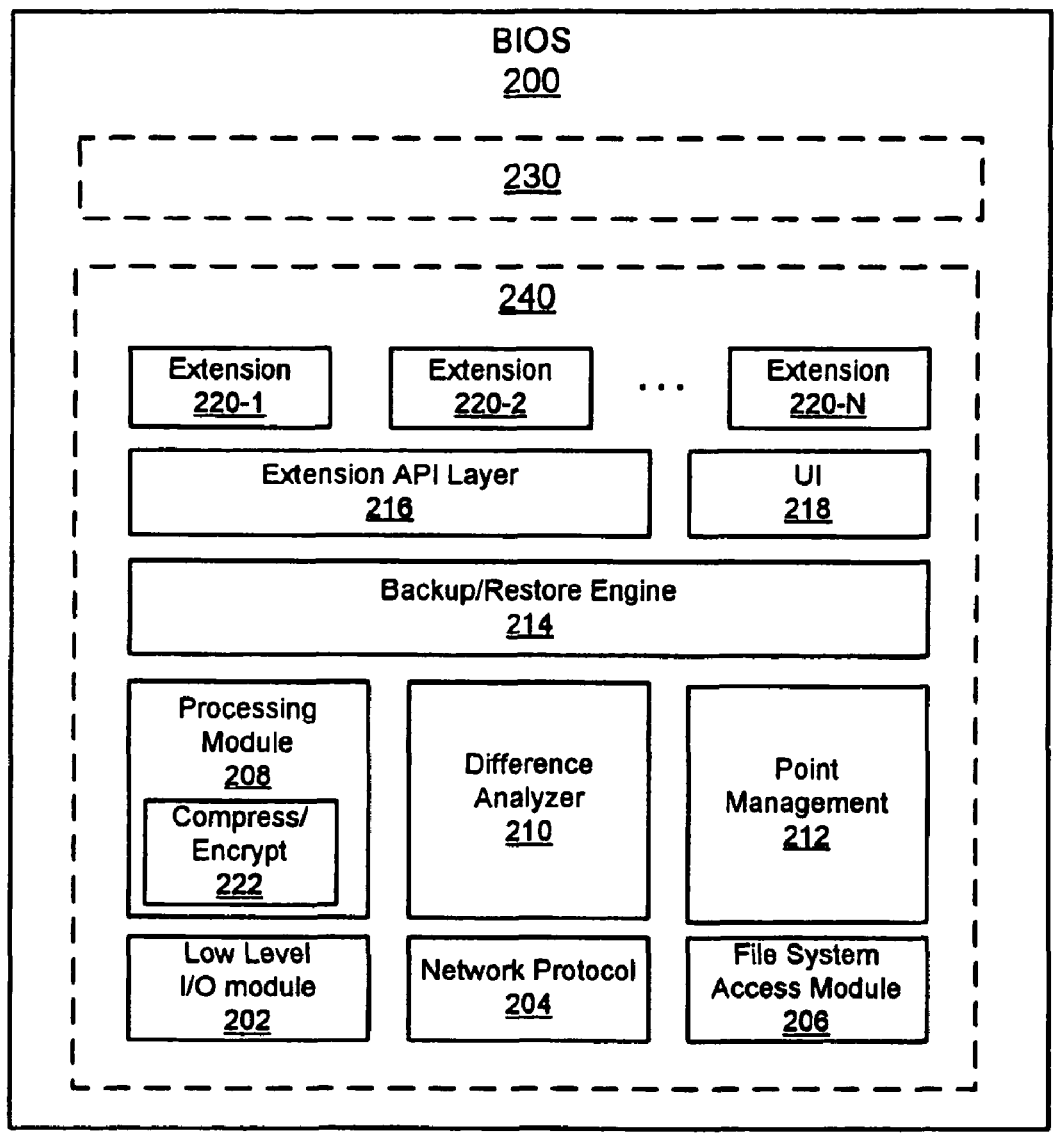
FIG. 2 illustrates an embodiment of a Basic Input/Output System.

FIG. 2 is a block diagram that illustrates an example embodiment of a BIOS 200. In one embodiment, the BIOS 200 may comprise a first module 230 that may perform system initialization, etc., for a computing device, such as computing device, 100, and/or a second module 240 that may perform system backup and/or restore for the computing device 100. While FIG. 2 shows that the first module 230 and the second module 240 are separated, in some embodiments, the BIOS 200 may comprise a module that may incorporate the functions of the first and/or second modules 230 and 240. In another embodiment, the embodiments of the BIOS 200 may be implemented in hardware, firmware, software, or any combination thereof. The embodiments of the BIOS 200 may also be implemented as instructions stored on a machine-readable medium. However, in some embodiments, the BIOS 200 may comprise a different structure.

The BIOS 200 may comprise one or more accessing modules, for example, a low level I/O module 202, a network protocol module 204, or a file system access module 206, that may each provide access to a backup destination or restore source. Referring to FIG. 1, in one embodiment, the network protocol/accessing module 204 may provide the computing device 100 with access to one or more remote devices 180 via one or more network 170. For example, the network protocol module 204 may enable data to be saved to the remote devices 180 or enable data to be retrieved from the remote devices 180. In one embodiment, the network protocol module 204 may be omitted, if the BIOS system 200 backs up data on hard disc or other storage devices.

Referring again to FIG. 2, in one embodiment, the low level I/O module 202 and the file system access module 206 may each provide access to one or more storage devices, for example, storage devices 150 of FIG. 1, so as to save backup data to the storage devices or obtain restore data from the storage devices. In one embodiment, the low level I/O module 202 may access one or more storage locations of a storage device based on a physical location or address, for example, a sector. Examples of the low level I/O module 202 may comprise low level hard disc 110 module 202, etc. In another embodiment, the file system access module 206 may access the storage device based on an index or attribute associated with a file or data. In yet another embodiment, the file system access module 206 may be based on an operation system, for example, Windows, etc.

The BIOS 200 may further comprise one or more modules to execute a data processing operation during system backup or a reverse operation during recovery, such as processing module 208. For example, the processing module 208 may compress and/or encrypt data for backup or to be saved. The processing module 208 may further decompress and/or decrypted data recovered from a remote device or a storage device. In one embodiment, the processing module 208 may comprise a compress/encrypt module or engine 222 to compress/decompress and/or encrypt/decrypt data. In another embodiment, the processing module 208 may comprise two modules that may execute compression/decompression and encryption/decryption, respectively. However, in some embodiments, the processing module 208 may perform other processing or may comprise one or more other modules to perform other processing.

In one embodiment, the BIOS 200 may enable users to choose to save one or more backup points via a user interface (UI) 218. In another embodiment, the UI 218 may enable users to choose a full backup or an incremental backup. For example, the full backup may back up one or more current files or data. The incremental backup may save changes in the files or data with respect to a basic backup, for example, a previous backup. In yet another embodiment, the user interface may enable the users to choose to back up data on storage devices or remote devices, etc. the UI 218 may comprise a graphic and/or text based module.

One or more backup points may be saved in a form of a data structure, such as array, list, table or other forms. The backup points may be saved on a storage device. In one embodiment, a backup point may comprise information associated with each backup, e.g., an identifier. For example, the backup point may comprise time information on a backup, such as the date and/or time of the backup. In another embodiment, the backup point may further comprise information on a type of the backup operation, for example, whether the backup operation is to back up or save one or more current files or is an incremental backup. The backup point may further comprise content information of the backup. For example, the backup point may comprise information to indicate a collection of one or more files or data for a backup, or the backup point may comprise information to identify the collection, e.g., one or more numbers or indexes for the files. In another embodiment, the backup point may comprise type information of one or more files or data for a backup operation. In another embodiment, in the case of an incremental backup, the backup point may comprise one or more file numbers or indexes corresponding to changes in the files between the current incremental backup and one of its previous backups.

In another embodiment, the BIOS 200 may comprise a module 210 for the incremental backup. For example, the module 210 may comprise a difference analyzer. In one embodiment, the difference analyzer 210 may check changes or differences in one or more files or data with respect to a basic backup, for example, a previous backup. For example, the difference analyzer 210 may compare the content of the current backup with that of the basic backup. In another embodiment, the difference analyzer may compare information, e.g., time information and/or content information, of the current backup point with that in the backup point of the basic backup to get the changes.

The BIOS 200 may further comprise a module 212 to manage the backup points. For example, the module 212 may comprise a point managing module. In one embodiment, the point managing module 212 may set up a backup point during a backup operation. The point managing module 212 may further record in the backup point whether the backup operation is to back up one or more current files or data or is an incremental backup. In another embodiment, the point managing module 212 may establish one or more relationships among the backup points, so as to enable the BIOS 200 to get information for a restoration based on the relationships during system recovery. For example, the point managing module 212 may establish a sequence of relationships between a backup and one or more basic backups, e.g., one or more previous backups.

The other modules in BIOS 200 may utilize the one or more relationship to execute/inhibit operation. For example, the UI 218 may send a warning to a user, in response to the user choosing to delete or erase backed up data of a backup that is a basic backup for another one. For another example, the UI 218 may further indicate whether the backed up data is deletable or erasable based on the relationships. In another embodiment, the difference analyzer 210 may collect the changes based on the one or more relationships.

Referring to FIG. 2, the BIOS 200 may further comprise a backup/restore module or engine 214. The backup/restore module or engine 214 may complete major operations of system backup or recovery. For example, the backup/restore engine 214 may save system data on storage devices or remote devices or retrieve system data from the storage devices or remote devices via one or more accessing modules, such as 202, 204 or 206. The backup/restore engine 214 may save all current files of a storage device, one or more files of some type, one file with a certain name or index, or files with a certain attribute, etc. In another embodiment, the backup/restore engine 214 may receive a backup or restore request from the computing device 100 or from a user via UI 218. While the backup/restore engine 214 is shown as one module in FIG. 2, in some embodiments, the BIOS 200 may comprise a backup engine and a restore engine that may be separated from each other.

The BIOS 200 may further comprise an interface 216 that may enable a user to add extension modules, such as extension modules 220-1 through 220-N, to the BIOS 200. In one embodiment, the interface 216 may comprise an Extension Application Program Interface (API) Layer. In one embodiment, each extension module 220-1 through 220-N may add additional functions for one or more other modules in BIOS 200. In another embodiment, each extension module 220-1 through 220-N may replace one or more existing modules in BIOS 200.

Figure 3:
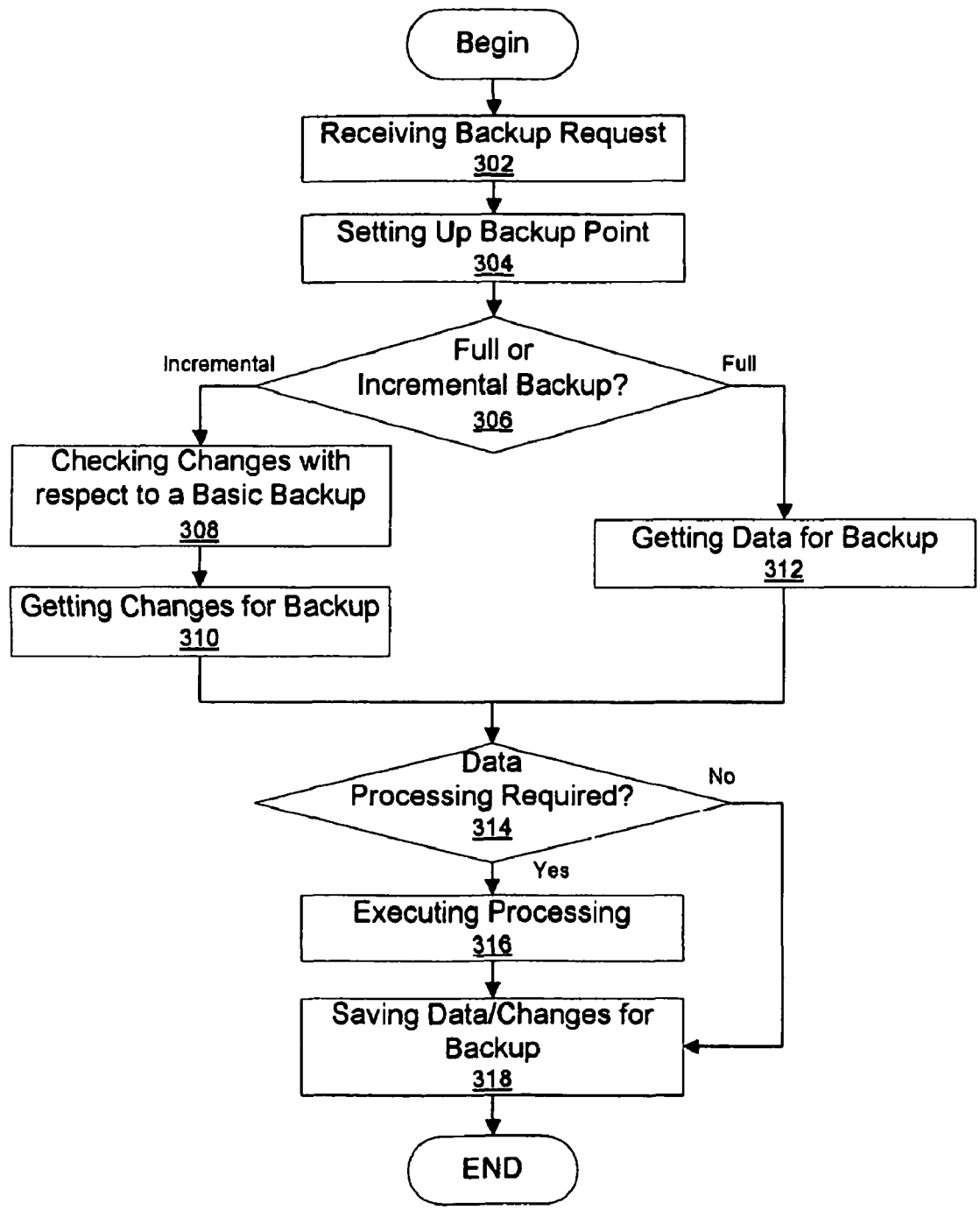
FIG. 3 illustrates an embodiment of a method that may be used in system backup.

FIG. 3 is a flow chart that illustrates an embodiment of a backup procedure. In one embodiment, the backup procedure may occur, e.g., before the operation system 134 of the computing device 100 is executed or when the operation system 134 is executed. In one embodiment, the computing device 100 or a user may enter or activate the BIOS 200 to perform backup. In block 302, the backup/restore engine 214 may receive the backup request, for example, from the processor 110 or from a user via UI 218. For example, the processor 110 may determine to execute a backup, e.g., periodically. In another embodiment, the user may initiate, e.g., periodically, a backup via the UI 218. The backup/restore engine 214 may execute a backup operation based on the backup request. The backup request may comprise information on the backup. For example, the backup request may comprise time information to back up files of some day. The backup request may comprise content information regarding a type of files to be backed up or a file name or index of each file. The backup request may further indicate the backup type. The point managing module 212 may set up or establish a backup point, for example, to record time information, content information and/or backup type information on the backup operation (block 304) in response to or based on a backup request.

In block 306, the backup/restore engine 214 may check a backup type based on the backup request. In one embodiment, the UI 218 may ask the user whether to save current data or back up changes in the data with respect to a basic backup, e.g., a previous backup (e.g., the last backup prior to the current backup). In another embodiment, the processor 110 may predetermine the backup type. In another embodiment, the backup/restore engine 214 may check the backup type based on the backup point.

For backing up changes, the difference analyzer 210 may check one or more changes, e.g., In one or more current files or data with respect to a basic backup (block 30a). For example, the user may determine the basic backup via UI 218. The processor 110 may predetermine the basic backup. The difference analyzer 210 may determine one or more changed files. In another embodiment, the difference analyzer 210 may monitor one or more operations with respect to the basic backup to track the changes. In another embodiment, the difference analyzer 210 may record or list information, e.g., index information, on the changes with a data structure, such as, for example, a list, an array, a table or any other structure. In block 310, the backup/restore engine 214 may get the one or more changes, for example, one or more changed files, from one or more storage devices 150.

On the contrary, for a full backup, the backup/restore engine 214 may obtain one or more current files or data to be backed up from one or more storage devices 150 (block 312). In block 314, the backup/restore engine 214 may check whether data processing on the data/changes for backup obtained respectively in block 310 or 312 is required, for example, based on a determination made by the user via UI 218 or a predetermination from the processor 110 or the backup request. In one embodiment, the data processing may comprise compression and/or encryption; however, other embodiments may comprise one or more different data processing operations.

In block 316, the processing module 208 may perform the required data processing on the data/changes for backup, in response to the backup/restore engine 214 determining that the data processing is required. In block 318, the backup/restore engine 214 may save the data/changes for backup to a storage device 150 via an accessing module, such as 202 and 206 or to a remote device 180 via the accessing module 204. In one embodiment, the user may select the storage device 150 or the remote device 180 via the user interface 218. In another embodiment, the processor 110 may predetermine to save the data/changes for backup on the storage device 150 or the remote device 180. On the contrary, in response to determining that no data processing is required or data processing is unnecessary, the backup/restore engine 214 may save the data/changes for backup to a storage device 150 or a remote device 180 without data processing.

Figure 4:
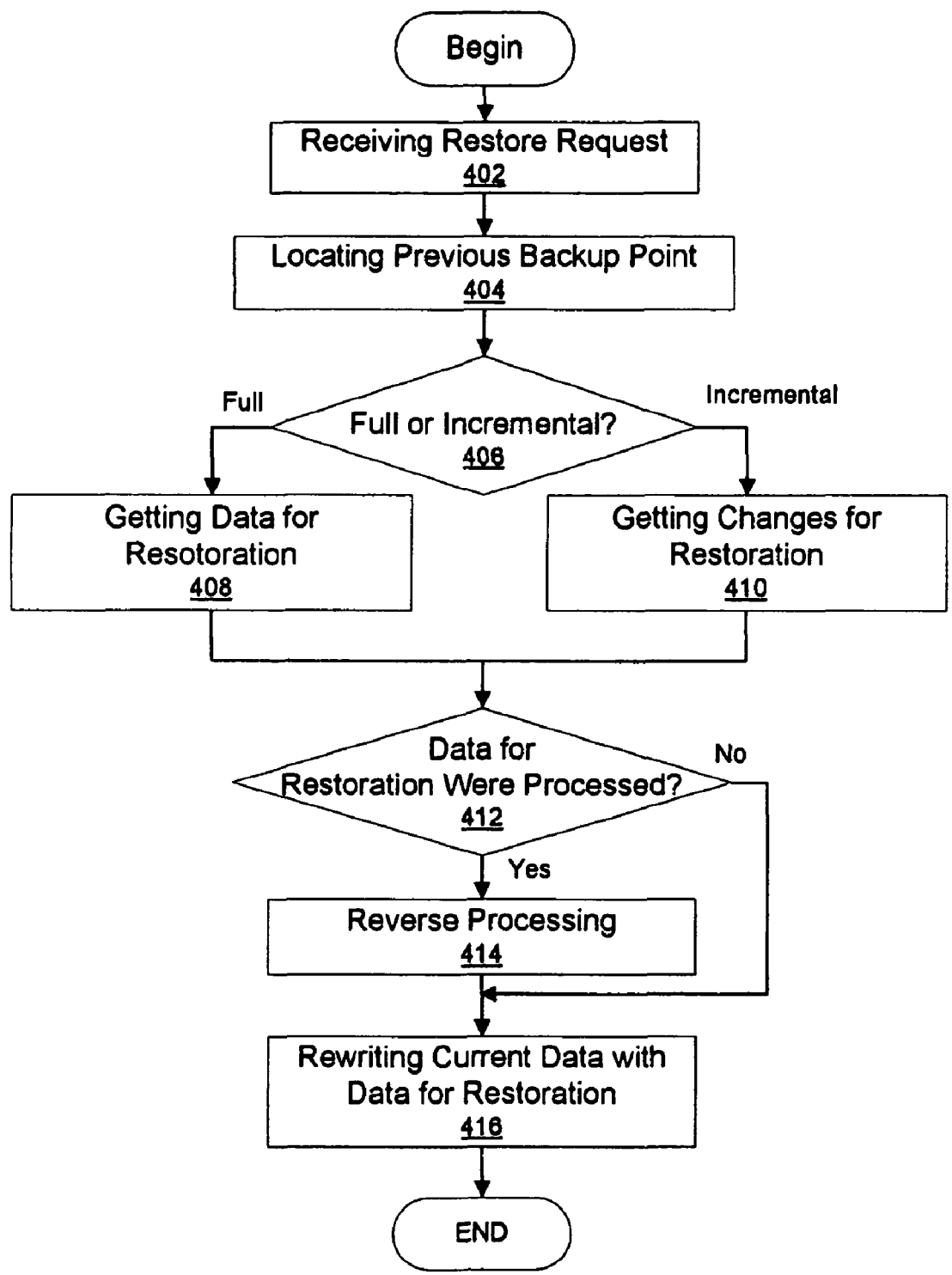
FIG. 4 illustrates an embodiment of a method that may be used in system recovery.

FIG. 4 is a flow chart that illustrates an embodiment of a recovery procedure. In one embodiment, the recovery may occur before executing the operation system 134 or during executing the operation system 134. In one embodiment, the computing device 100 or a user may enter or activate the BIOS 200 to perform recovery. In block 402, the backup/restore engine 214 may receive the recovery request from the computing device 100, e.g., the processor 110 or a user via UI 218. The backup/restore engine 214 may Initiate a restoration operation in response to the recovery request. The recovery request may comprise information to indicate to which files or data the restoration operation relates to, e.g., time information and/or content information, etc. In another embodiment, the information may be predetermined by the processor 110 or determined by the user via UI 218.

In block 404, the point management module 212 may locate one or more backup points for the restoration operation based on the information in the recovery request or a criterion defined in the request. In one embodiment, the point management module 212 may locate the backup point based on time information and/or content information on data to be restored, as determined by the processor 110 or determined by the user via UI 218 in the backup request. For example, the point management module 212 may locate a previous backup point that comprises time information e.g., one day before the restoration, and/or content information, e.g., a file number, type, name or index, etc.

In block 406, the backup/restore engine 214 may determine whether the backup point located in block 404 relates to a previous incremental backup or a previous full backup. For example, the backup/restore engine 214 may check the backup type based on the backup point. In another embodiment, the backup/restore engine 214 may check the backup type from a data structure that stores information on the backed up changes.

In block 408, in response to determining that the backup point relates to a previous full backup, the backup/restore engine 214 may get or retrieve data corresponding to the backup point from a storage device 150 via one of the accessing module 202 and 206 or a remote device 180 via the accessing module 204. In one embodiment, the backup/restore engine 214 may retrieve one or more files that were backed up at the backup point based on the backup request.

On the contrary, in block 410, in response to the backup/restore engine 214 determining that the backup point relates to a previous incremental backup, e.g., A, the difference analyzer 212 may determine a basic backup, e.g., B, for A. The difference analyzer 212 may obtain one or more changes between A and B from a storage device 150 via one of the accessing module 202 and 206 or a remote device 180 via the accessing module 204. In one embodiment, the backup/restore engine 214 may undo one or more operations bringing the changes so as to obtain data for restoration. In another embodiment, the backup/restoration engine 214 may retrieve data associated with B plus the changes between A and B to obtain the data for restoration.

In another embodiment, if B is an incremental backup, the difference analyzer 212 may further check a basic backup, e.g., C, for B, and so on. In one embodiment, the difference analyzer 212 may obtain one or more changes between A and C. The backup/restore engine 214 may undo one or more operations bring the changes so as to obtain data for restoration. In another embodiment, the difference analyzer 212 may obtain one or more changes between A and B and between B and C. The backup/restore engine 214 may retrieve data that was backed up at C plus the changes between A and B and between B and C to obtain the data for restoration. However, in some embodiments, the backup/restore engine 214 may obtain data for restoration in a different way.

In block 412, the backup/restore engine 214 may check whether the data for restoration obtained in block 408 or 410 were processed before the restoration operation. For example, the backup/restore engine 214 may determine whether the data for restoration were compressed and/or encrypted. In block 414, in response to determining that the data for restoration were compressed, the processing module 208 may perform decompression on the data for restoration. In another embodiment, the processing module 208 may decrypt the data for restoration, in response to determining that the data for restoration were encrypted in the previous backup operations. In yet another embodiment, the processing module 208 may perform a reverse operation on the data for restoration, in response to a predetermination from processor 110 or a determination from the user via UI 218. In block 416, the backup/restore engine 214 may rewrite one or more current files or data with the data for restoration obtained in blocks 408, 410 or 414. For example, the backup/restoration engine 214 may clear the current files or data from the one or more storage devices 150 and write the data for restoration into the corresponding storage devices 150.

While the methods of FIGS. 3 and 4 are illustrated as a sequence of operations, the illustrated operations may be performed in a different order. In one embodiment, the operations relating to data processing and reverse processing may be omitted from FIGS. 3 and 4, respectively, so that the processing module 208 may be omitted from BIOS 200. In another embodiment, the BIOS 200 may comprise one or more accessing modules that may be different from the accessing modules as shown in FIG. 2.

While certain features of the invention have been described with reference to embodiments, the description is not intended to be construed in a limiting sense. Various modifications of the embodiments, as well as other embodiments of the invention, which are apparent to persons skilled in the art to which the invention pertains are deemed to lie within the spirit and scope of the invention.

What is claimed is:

1. A system comprising:
   a memory;
   a processor that couples to the memory;
   a basic input output system that couples to the processor, wherein the basic input output system comprises:
   a first module to perform system backup in response to a backup request and perform system recovery in response to a recovery request,
   a user interface to enable a user of the system to save one or more backup points that comprises one or more from a group comprising time information on the backup operation, type of the backup operation, information on content to be backed up in the backup operation, information to identify the content, a point management module to establish a relationship among the backup points and locate a backup point associated with the recovery request based on the relationship.

2. The system of claim 1, wherein the first module comprises:

a backup module to execute a backup operation based on the backup request; and a restore module to execute a restore operation based on the recovery request.

3. The system of claim 1, wherein the basic input output system comprises:

a difference analyzer to check one or more changes in data of the system with respect to a basic backup.

4. The system of claim 1, wherein the basic input output system comprises:

an accessing module to provide access to a storage device to store backup data.

5. The system of claim 1, wherein the basic input output system comprises:

a network accessing module to enable the basic input output system to access a remote device to store backup data.

6. The system of claim 1, wherein the user interface is further to enable a user to choose in the system backup between a full backup and an incremental backup.

7. The system of claim 1, wherein the basic input output system comprises:

one or more extension modules that provide one or more additional functions in the basic input output system; and an interface to add the one or more extension modules to the basic input output system.

8. The system of claim 1, wherein the basic input output system comprises:

a processing module to execute a processing operation on data for backup and to execute a reverse operation on data for restoration in response to the first module determining that the processing operation or the reverse operation is required, wherein the processing operation comprises one or more of a compression operation and an encryption operation.

9. A system, comprising:

a basic input output system that comprises:

a first module to perform system initialization for a computing device;

a second module to back up one or more files of the computing device in response to a backup request and to restore one or more files of the computing device in response to a recovery request;

a user interface to enable a user of the computer device to save one or more backup points that comprises one or more from a group comprising time information on the backup operation, type of the backup operation, information on content to be backed up in the backup operation, information to identify the content; and a point management module to establish a relationship among the backup points and locate a backup point associated with the recovery request based on the relationship.

10. The system of claim 9, wherein the user interface is further for a user to choose between backing up one or more current files and one or more changes in the files with respect to a previous backup operation for the backup request; and the second module further comprises a difference analyzer to get the changes for the backup request in response to the user choosing to back up the changes via the user interface, and get one or more changes associated with the one or more backup points for the restoration operations, wherein the second module further to back up the changes for the backup request.

11. The system of claim 9, further comprising:

a processing module to compress and encrypt the files for backup and to decompress and decrypt the files for restoration.

12. The system of claim 9, wherein the user interface further enables a user to choose between backing up the files on a storage device of the computing device and on a remote computing device for the backup request, an accessing module to provide access to the storage device; and a remote accessing module to provide access to the remote computing device.

13. The system of claim 9, further comprising:

an interface to enable one or more extension modules to be added to the system, wherein the one or more extension modules may provide one or more functions to the system.

14. A method comprising:

entering a basic input and output system of a computing device;

using the basic input and output system to perform a backup operation for the computing device in response to a backup request;

using the basic input and output system to perform a restoration operation for the computing device in response to a recovery request;

providing a user interface in the basic input and output system to enable a user of the computing device to save one or more backup points that comprises one or more from a group comprising time information on the backup operation, type of the backup operation, information on content to be backed up in the backup operation, information to identify the content;

establishing a relationship among the backup points and locate a backup point associated with the recovery request based on the relationship.

15. The method of claim 14, further comprising:

indicating whether the backed up data is deletable or erasable based on the relationship via the user interface.

16. The method of claim 14, further comprising:

determining whether the backup operation relates to backing up data of the computing device or a change in the data with respect to a previous backup operation.

17. The method of claim 16, further comprising:

in response to determining to back up the change, obtaining the change for the backup operation from the computing device.

18. The method of claim 16, further comprising:

in response to determining to back up the data of the computing device, obtaining the data for the backup operation from the computing device.

19. The method of claim 14, further comprising:
saving data for backup to a storage device of the computing device.

20. The method of claim 14, further comprising:
saving data for backup to a remote device.

21. The method of claim 14, further comprising:
determining whether to perform a data processing operation on data for backup in the backup operation, wherein the data processing operation comprises one or more selected from a group comprising an encryption operation, a compression operation, a decryption operation and a decompression operation.

22. The method of claim 21, further comprising:
performing the data processing operation, in response to determining that the data processing operation is required.

23. The method of claim 14, further comprising:
locating a previous backup operation based on the recovery request.

24. The method of claim 14, further comprising:
determining whether the previous backup operation is a full backup or an incremental backup.

25. The method of claim 24, further comprising:
in response to determining that the previous backup is an incremental backup, retrieving one or more changes associated with the incremental backup from the computing device.

26. The method of claim 14, further comprising:
retrieving data from the computing device that were backed up in one or more previous backup operations to get data for restoration.

27. The method of claim 26, further comprising:
rewrite one or more current files of the computing device with the data for restoration.

28. A machine readable storage medium comprising machine readable code that in response to being executed result in a firmware to
activate a basic input and output system of a computing device to perform a restoration operation on data of a computing device in response to a recovery request, and perform a backup operation on the computing device in response to a backup request;
provide a user interface in the firmware to enable a user of the computer device to save one or more backup points that comprises one or more from a group comprising time information on the backup operation, type of the backup operation, information on content to be backed up in the backup operation, information to identify the content; and
establish a relationship among the backup points and locate a backup point associated with the recovery request based on the relationship.

29. The machine readable storage medium of claim 28, wherein the machine readable storage medium further comprising machine readable code to
determine whether the previous backup point relates to a full backup that backs up data of the computing device or an incremental backup that backs up one or more changes in the data with respect to a backup point prior to the previous backup point.

30. The machine readable storage medium of claim 28, wherein the machine readable storage medium further comprising machine readable code to
retrieve the one or more changes from the computing device, in response to determining that the previous backup point relates to the incremental backup; and
obtain data for restoration from the changes.

31. The machine readable storage medium of claim 28, wherein the machine readable storage medium further comprising machine readable code to
retrieve data from the computing device that were backed up in one or more previous backup operations to get data for restoration based on the restoration request.

32. The machine readable storage medium of claim 31, wherein the machine readable storage medium further comprising machine readable code to
determine whether to perform decompression and decryption on the data for restoration.

33. The machine readable storage medium of claim 32, wherein the machine readable storage medium further comprising machine readable code to
decompress and decrypt the data for restoration, in response to determining that the decompression and decryption is required.

34. The machine readable storage medium of claim 28, wherein the machine readable storage medium further comprising machine readable code to
rewrite one or more current files of the computing device with data for restoration.

* * * * *